United States Patent [19]
Kullenberg et al.

[11] Patent Number: 4,559,220
[45] Date of Patent: Dec. 17, 1985

[54] CRYSTALLIZATION OF POLYALUMINIUM HYDROXIDE COMPLEXES

[75] Inventors: Eric N. F. Kullenberg, Höganäs; Gertrud M. Lindahl; Lars E. H. Persson, both of Helsingborg, all of Sweden

[73] Assignee: Boliden Aktiebolag, Stockholm, Sweden

[21] Appl. No.: 552,680

[22] Filed: Nov. 17, 1983

[30] Foreign Application Priority Data

Dec. 9, 1982 [SE] Sweden .................. 8207054

[51] Int. Cl.$^4$ .................. C01F 11/46; C01F 7/56
[52] U.S. Cl. .................. 423/556; 423/629; 423/128; 23/305 A
[58] Field of Search .............. 423/128, 199, 625, 626, 423/629, 630, 556, 551; 23/305 A

[56] References Cited

U.S. PATENT DOCUMENTS

| | | | |
|---|---|---|---|
| 3,268,295 | 8/1966 | Armbrust, Jr. et al. | 23/305 A |
| 3,331,661 | 7/1967 | Boiston et al. | 423/551 |
| 4,021,528 | 5/1977 | Schlegel | 23/305 A |
| 4,059,681 | 11/1977 | Hem et al. | 423/630 |
| 4,083,933 | 4/1978 | Schlegel | 23/305 A |
| 4,098,883 | 7/1978 | Madaus | 423/512 A |
| 4,238,347 | 12/1980 | Gancy et al. | 423/629 |
| 4,242,328 | 12/1980 | Hem et al. | 423/630 |

FOREIGN PATENT DOCUMENTS

| | | |
|---|---|---|
| 0062015 | 6/1982 | European Pat. Off. |
| 7201333-7 | 12/1974 | Sweden |
| 385687 | 7/1976 | Sweden |
| 7412965-1 | 11/1977 | Sweden |
| 7805135-6 | 5/1978 | Sweden |
| 7503641-8 | 3/1979 | Sweden |
| 8101830-1 | 3/1981 | Sweden |
| 8101829-3 | 3/1981 | Sweden |
| 8104149-3 | 7/1981 | Sweden |
| 8104148-5 | 5/1982 | Sweden |

OTHER PUBLICATIONS

Skoog et al, Fundamentals of Analytical Chemistry, Holt, Rinehart & Winston, N.Y., N.Y., 1963, pp. 151–152.

Primary Examiner—Gary P. Straub
Attorney, Agent, or Firm—Brumbaugh, Graves, Donohue & Raymond

[57] ABSTRACT

The present invention relates to a method for producing a polyaluminium hydroxide complex of a chloride and sulphate type in solid form, an aqueous solution of the polyaluminium hydroxide complex being admixed with at least one water-miscible organic solvent having 1–4 C, the weight ratio of the aqueous solution to the solvent being at least 1:0.70, preferably 1:1-2, to crystallize the complex.

The method provides a highly stable, amorphous crystalline product.

2 Claims, No Drawings

CRYSTALLIZATION OF POLYALUMINIUM HYDROXIDE COMPLEXES

DESCRIPTION

1. Technical Field

The present invention relates to the crystallization of polyaluminium hydroxide complexes, particularly polyaluminium hydroxide complexes poor in sulphate and having the general formula $$[Al(OH)_x(SO_4)_y(H_2O)_z]_n$$

where
x is 0.75–2.0, preferably 1.5–2.0
y is 0.5–1.12, preferably 0.5–0.75

$$x + 2y = 3$$

z is 1.5–4, suitably 1.5–3.0, but also polyaluminium hydroxide sulphate complexes of the formula $Al_m(OH)_n^{(3m-n)+}$ with sulphate anions, and similarly polyaluminium hydroxide chloride complexes.

The object of the present invention is to provide the possibility of obtaining polyaluminium hydroxide complexes in solid crystalline form, without risk of destroying the substance.

2. Background Art

Methods relating to the production of polyaluminium hydroxide sulphate complexes which are poor in sulphate are known from SE,A, No. 8104148-5, SE,A, No. 8104149-3, SE,A, No. 8206206-8 and SE,A, No. 8206207-6. In this respect it has been found necessary in certain cases to stabilize these complexes with citric acid or some other α-hydroxycarboxylic acid, or with a heptonate, in order to render aqueous solutions of such complexes more stable in storage, i.e. aqueous solutions where z in the above formula is >4.

The cited patent specifications also disclose the preparation of such complexes in a dry form, i.e. z has been brought to 1.5 to 4 by thin-film layer vapourization. It has been found, however, that complexes are unable to withstand excessively high vapourizing temperatures, and that because the complexes become tacky and clog the evaporator, serious practical problems are encountered when manufacturing solid products industrially with the aid of thin-film evaporators.

It is also known from SE,A, No. 7805135-6 and SE,A, No. 8101830-1, (=EP,A, No. 82850050.4) to produce aqueous solutions of polyaluminium hydroxide sulphate complexes of the general formula $Al_m(OH)_n^{(3m-n)+}$ with sulphate ions, m and n both being positive integers. When these complexes are in the form of aqueous solutions, it may be found more expedient for the complexes to have a solid form, so as to reduce transportation costs. The products as such, however, are stable, even in aqueous solution.

The preparation of aqueous solutions of polyaluminium hydroxide chloride complexes of the general formula $Al_m(OH)_n^{(3m-n)+}$ with chloride ions, in which m and n are both positive integers, is known, inter alia, from SE,A, No. 8101829-3 (=EP,A, No. 82850051.2).

Other aluminium hydroxide chloride complexes are those having the formula $[AlCl_x(OH)_{3-x}]_n$ in which x is smaller than 3, normally from 1 to 2. These complexes are known from SE,B, No. 7201333-7; SE,B, No. 7405237-4; SE,B, No. 7412965-1; SE,B, No. 7503641-8; and DE,A, No. 2630768. Another type of polyaluminium chloride complex of the formula $[AlCl_3 \cdot X\ AOH]_n$ in which A is an alkali metal, and $[AlCl_3 \cdot x/2B\ (OH)_2]_n$, in which B is an alkali earth metal, and n is a positive integer and x is a number between 1–2.7, is known from FR,A, No. 7512975.

It is desirable, however, to obtain the products in a solid form, since it will then be more stable in storage.

DESCRIPTION OF THE PRESENT INVENTION

It has now surprisingly been found possible to produce such polyaluminium hydroxide complexes in solid form by means of the present invention, which is characterized by adding to an aqueous solution of the aforesaid polyaluminium hydroxide complex, an organic solvent selected from the group acetone, methanol, ethanol, n-propanol, isopropanol, and tertiary butanol, the weight ratio between said aqueous solution and solvent being at least 1:0.7, preferably 1:1–2.

Other characterizing features of the invention are set forth in the accompanying claims.

The invention will now be described in more detail with reference to the following Examples.

EXAMPLE 1

50.3 grams of aluminium sulphate in solution with 37.3 grams of water were admixed with 12.4 grams of calcium hydroxide, whereupon gypsum precipitated and an aqueous solution having 6% Al and an OH/Al-molar ratio of 1.7 and containing 14.5% SO$_4$ was obtained.

50 grams of said solution was admixed with 50 grams of methanol, there being obtained after 2 hours a crystalline product comprising 17.8% Al, 35.7% SO$_4$ and having an OH/Al ratio of 1.9. The yield was 92%.

The product was dried with air for five calendar days, resulting in further water reduction to 17.9% Al. The product was not hygroscopic. This was proven by storing the product for three weeks at 50° C. in an atmosphere of 55% relative humidity, and measuring the increase in water content, which was found to be from 1 to 3%.

EXAMPLE 2

50 grams of an aqueous solution of polyaluminium hydroxide sulphate complex according to Example 1 was added gradually to 35 grams of ethanol, whereupon a solid crystalline product comprising 16% Al was obtained. The solvent was filtered off and the product obtained in a lump on the filter.

EXAMPLES 3–5

| Ex nr | Poly AlOH SO$_4$ complex solution gram | MeOH g | Dry product, Analysis | | | Yield % |
|---|---|---|---|---|---|---|
| | | | Al % | SO$_4$ % | mole OH/Al | |
| 3 | 50 | 75 | 19.0 | 40.4 | 1.8 | 91 |
| 4 | 50 | 100 | 18.0 | 39.4 | 1.8 | 92 |
| 5 | 50 | 25 | No solid product | | | |

EXAMPLES 6–8

A polynucleate aluminium hydroxide sulphate complex solution produced in accordance with SE,A, No. 8101830-1 and having a molar ratio of OH to Al of 1.7 and an aluminium content of 2.3% was crystallized in accordance with the preceding examples.

| Ex nr | Poly Al—OH SO4 complex gram | MeOH gram | Dry product, Analysis | | | | yield |
|---|---|---|---|---|---|---|---|
| | | | Al % | SO4 % | Na % | mole OH/Al | |
| 6 | 50 | 100 | 10.0 | 49.9 | 12.8 | 1.7 | 93 |
| 7 | 50 | 50 | 10.2 | 50.2 | 12.3 | 1.7 | 94 |
| 8 | 40 | 50 | 9.9 | 45.3 | 12.4 | 1.9 | 92 |

EXAMPLE 9

A sulphate-poor polyaluminium hydroxide sulphate complex according to Example 1 and having an OH/Al mole ratio of 1.6 was crystallized with acetone. In this respect, 50 grams were crystallized with 100 grams of acetone. The yield was 94%, and the dry-solids content comprised Al 15.9% and SO4 38.4%. The mole ratio was 1.6.

EXAMPLE 10

A polynucleate aluminium hydroxide chloride complex having an OH/Al mole ratio of 1.5 and an aluminium content of 5% was crystallized in isopropanol, with 50 grams solution and 100 grams isopropanol. The yield of dry-solid product was 89%, containing 14.7% Al and having an OH/Al mole ratio of 1.6.

EXAMPLE 11

The experiment recited in Example 1 was repeated, although in this case 75 grams of isopropanol were used instead of 50 grams methanol. The final product contained 14.9% Al and had a mole OH/Al of 1.7. The solid products obtained in Examples 1–11 had an amorphous crystalline structure.

EXAMPLE 12

An aqueous solution according to Example 1 was thin-film evaporated at 65° C., there being obtained a solid product containing 16.9% aluminium and having an OH/Al mole ratio of 1.65. This product was stored for three weeks at temperatures of 50° C. and 70° C. respectively, in an atmosphere having a relative humidity of 55%. At the first mentioned temperature, the product absorbed about 6% $H_2O$, and about 12% $H_2O$ at the last mentioned temperature.

The products obtained were used, inter alia, as water purifying agents, retention agents within the cellulose industry, and for de-watering organic plants.

We claim:

1. A method for producing a polyaluminium hydroxide complex in solid form, which is soluble in an aqueous solution, comprising admixing an aqueous solution of a polyaluminium hydroxide complex with an organic solvent selected from the group consisting of acetone, methanol, ethanol, n-propanol, isopropanol and tertiary butanol, at least about 0.7 grams of the organic solvent being added per gram of aqueous solution, and isolating the resultant complex.

2. A method according to claim 1, wherein the weight ratio of the aqueous solution of polyaluminium hydroxide complex to organic solvent is 1:1–2.

* * * * *